US008149234B2

(12) United States Patent
Azar et al.

(10) Patent No.: US 8,149,234 B2
(45) Date of Patent: Apr. 3, 2012

(54) PICTURE PROCESSING USING A HYBRID SYSTEM CONFIGURATION

(75) Inventors: Hassane S. Azar, San Francisco, CA (US); Franck R. Diard, Mountain View, CA (US); Amit Parikh, Santa Clara, CA (US); Xun Wang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/280,769

(22) Filed: Oct. 25, 2011

(65) Prior Publication Data

US 2012/0042190 A1  Feb. 16, 2012

Related U.S. Application Data

(63) Continuation of application No. 12/271,710, filed on Nov. 14, 2008, now Pat. No. 8,054,316.

(51) Int. Cl.
*G06F 15/16* (2006.01)
*G06F 13/14* (2006.01)
*G06F 15/00* (2006.01)
*G06F 9/00* (2006.01)
*G06F 1/00* (2006.01)
*G09G 5/00* (2006.01)

(52) U.S. Cl. ........ 345/418; 345/502; 345/518; 345/520; 345/211; 712/1; 712/220; 713/1; 713/300; 713/320; 713/324

(58) Field of Classification Search .......... 345/501–502, 345/506, 519–522, 204, 211; 712/1, 10, 712/32, 200, 220; 713/1, 300, 320, 324, 713/375, 340
See application file for complete search history.

(56) References Cited

U.S. PATENT DOCUMENTS

| | | | |
|---|---|---|---|
| 2005/0218218 A1* | 10/2005 | Koster | 235/383 |
| 2005/0250452 A1* | 11/2005 | Walton et al. | 455/63.4 |
| 2008/0177434 A1* | 7/2008 | Moran | 701/22 |
| 2009/0037620 A1* | 2/2009 | Brokenshire et al. | 710/57 |
| 2010/0145562 A1* | 6/2010 | Moran | 701/22 |

* cited by examiner

*Primary Examiner* — Wesner Sajous
(74) *Attorney, Agent, or Firm* — Patterson & Sheridan, LLP

(57) ABSTRACT

A system is presented that is configured to reduce power consumption when performing processing tasks. The system includes a first processing entity capable of performing a set of operations, and a second processing entity configured to consume less power than the first processing entity and capable of performing a subset of operations that is part of the set of operations. During system operation, the second processing entity is configured to perform the subset of operations instead of the first processing entity.

20 Claims, 7 Drawing Sheets

PICTURE PROCESSING USING A HYBRID SYSTEM CONFIGURATION

CROSS-REFERENCE TO RELATED APPLICATIONS

This application is a continuation of U.S. application Ser. No. 12/271,710, filed on Nov. 14, 2008 now U.S. Pat. No. 8,054,316. The subject matter of this related application is hereby incorporated herein by reference.

FIELD OF THE INVENTION

Embodiments of the present invention relate generally to processing a picture in a hybrid system configuration, and more specifically to using an integrated processor to process a picture generated by a discrete processor.

DESCRIPTION OF THE RELATED ART

Conventionally, video images are adjusted to modify the contrast before the video images are converted from YUV color space to RGB (red, green, blue) color space. In order to perform adjustments, such as changing the contrast the image is converted to RGB color space, analyzed to determine the contrast levels, and then the image RGB values are adjusted to modify the contrast. The backlight of the display may be dimmed to reduce the power consumption and extend the battery life of notebook and other portable computing devices. In order to maintain the perceived visual quality of the displaced image, the contrast of the image may be changed. However, when the graphics processor is used to convert the video image to RGB color space and then subsequently analyze the image, and adjust the contrast, the overall processing performance of the system may be reduced as additional bandwidth and processing power is consumed to perform those operations.

Accordingly, what is needed in the art is a system and method for adjusting video images while minimizing the impact on graphics processing performance.

SUMMARY OF THE INVENTION

A system is presented that is configured to reduce power consumption when performing processing tasks. The system includes a first processing entity capable of performing a set of operations, and a second processing entity configured to consume less power than the first processing entity and capable of performing a subset of operations that is part of the set of operations. During system operation, the second processing entity is configured to perform the subset of operations instead of the first processing entity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1A:
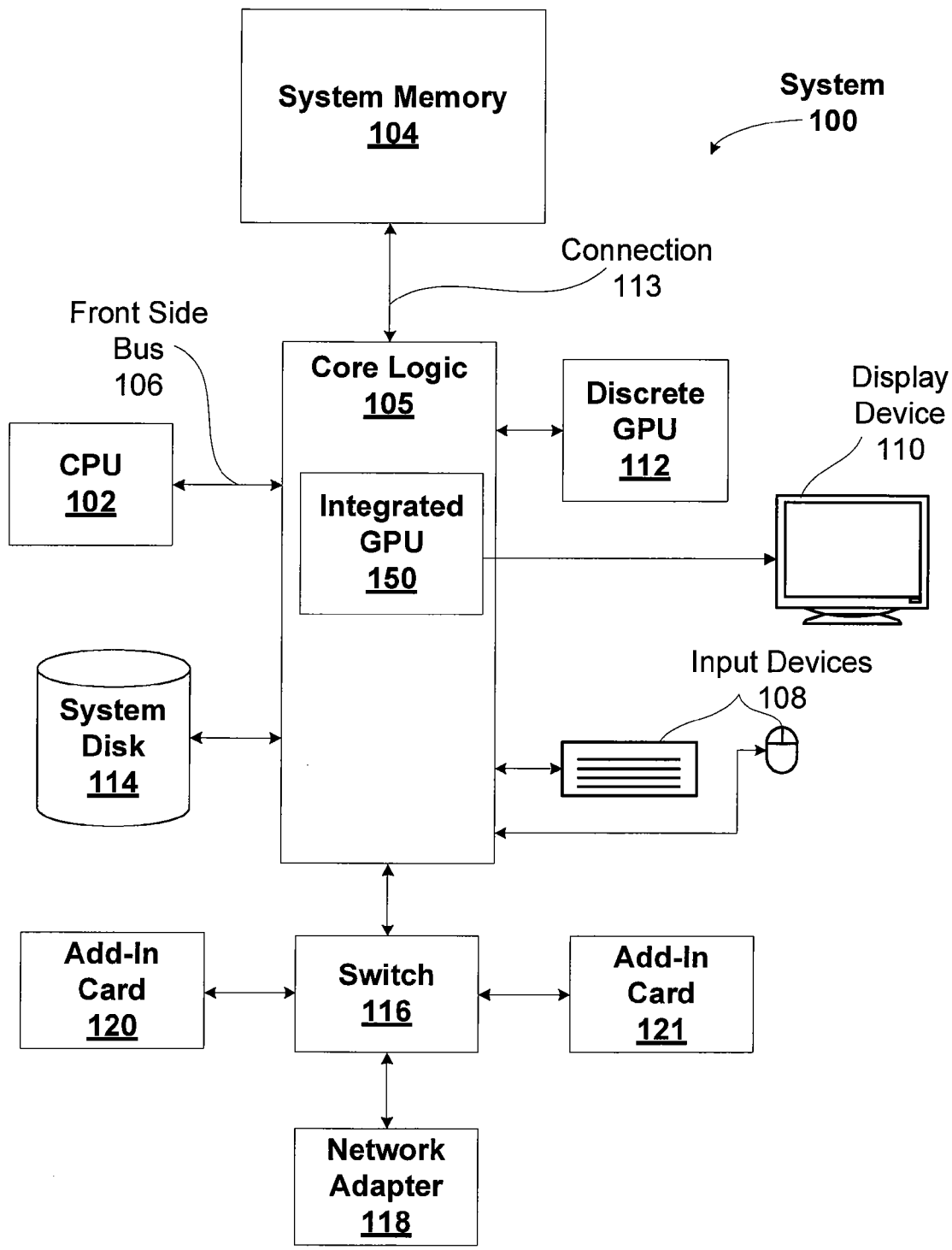
FIGS. 1A and 1B are block diagrams illustrating a computer system configured to implement one or more aspects of the present invention.

FIG. 1A is a block diagram illustrating a computer system 100 configured to implement one or more aspects of the present invention. Computer system 100 is a hybrid computing platform that includes multiple processing units in order to provide various levels of activities and levels of power consumption. Computer system 100 includes a central processing unit (CPU) 102 and a system memory 104 communicating via a bus path that includes a core logic 105. Core logic 105 includes an integrated GPU 150 that typically provides less performance and consumes less power than a discrete GPU 112.

Core logic 105 is a bridge device that couples CPU 102 to one or more other devices in the platform and is coupled to system memory 104 via a connection 113. Core logic 105 receives user input from one or more user input devices 108 (e.g., keyboard, mouse) and forwards the input to CPU 102 via path 106.

Discrete GPU 112 is coupled to core logic 105 via a bus or other communication path (e.g., a PCI Express, Accelerated Graphics Port, or HyperTransport link); in one embodiment discrete GPU 112 is a graphics subsystem that processes two-dimensional (2D) graphics data, three-dimensional (3D) graphics data and/or video data to produce pictures. The pictures produced from video data are typically represented in YUV color space and are converted to RGB color space for display on display device a 110. A device driver may be stored in system memory 104, to interface between processes executed by CPU 102, such as application programs, and discrete GPU 112 and integrated GPU 150, translating program instructions as needed for execution by discrete GPU 112 and integrated GPU 150, as described in conjunction with FIG. 3. While system 100 operates in the low power mode, core logic 105 may configure discrete GPU 112 to enter a powered off state by controlling the voltage input to discrete GPU 112 through a voltage regulator. Similarly, core logic 105 may configure system memory 104 to enter a powered off state by controlling a voltage input to system memory 104.

Core logic 105 is coupled to display device 110 (e.g., a conventional CRT or LCD based monitor) and may control the backlight level in order to vary the power consumption of display device 110. A system disk 114 is also connected to core logic 105. A switch 116 provides connections between core logic 105 and other components such as a network adapter 118 and various add-in cards 120 and 121. Other components (not explicitly shown), including USB or other port connections, CD drives, DVD drives, film recording devices, and the like, may also be connected to core logic 105. Communication paths interconnecting the various components in FIG. 1A may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 1B:
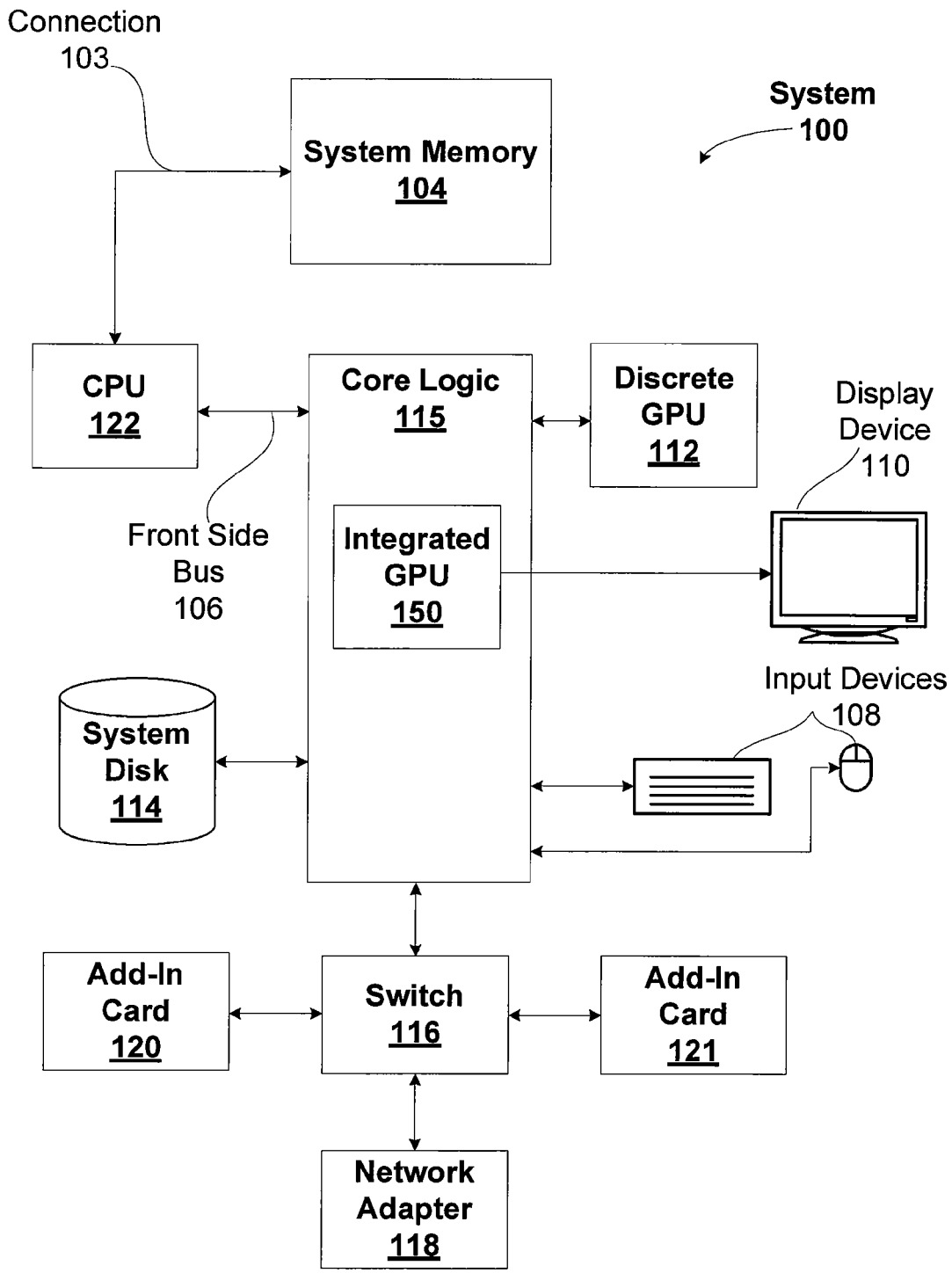

FIG. 1B is another block diagram illustrating a computer system 100 configured to implement one or more aspects of the present invention. In contrast with FIG. 1A, system memory 104 is connected to a CPU 122 directly via connection 103 rather than through a core logic 115, and other devices communicate with system memory 104 via core logic 115 and CPU 122.

It will be appreciated that the system shown herein is illustrative and that variations and modifications are possible. The connection topology, including the number and arrangement of bridges, may be modified as desired. In other alternative topologies, GPU 112 is connected directly to CPU 102 or CPU 122, rather than to core logic 105 or core logic 115. In still other embodiments, core logic 105 or core logic 115 may be separated into a multiple chips. The particular components shown herein are optional; for instance, any number of add-in cards or peripheral devices might be supported. In some embodiments, switch 116 is eliminated, and network adapter 118 and add-in cards 120, 121 connect directly to core logic 105 or core logic 115. The connection of GPU 112 to the rest of system 100 may also be varied. In some embodiments, GPU 112 is implemented as an add-in card that can be inserted into an expansion slot of system 100

Core Logic Overview

Figure 2A:
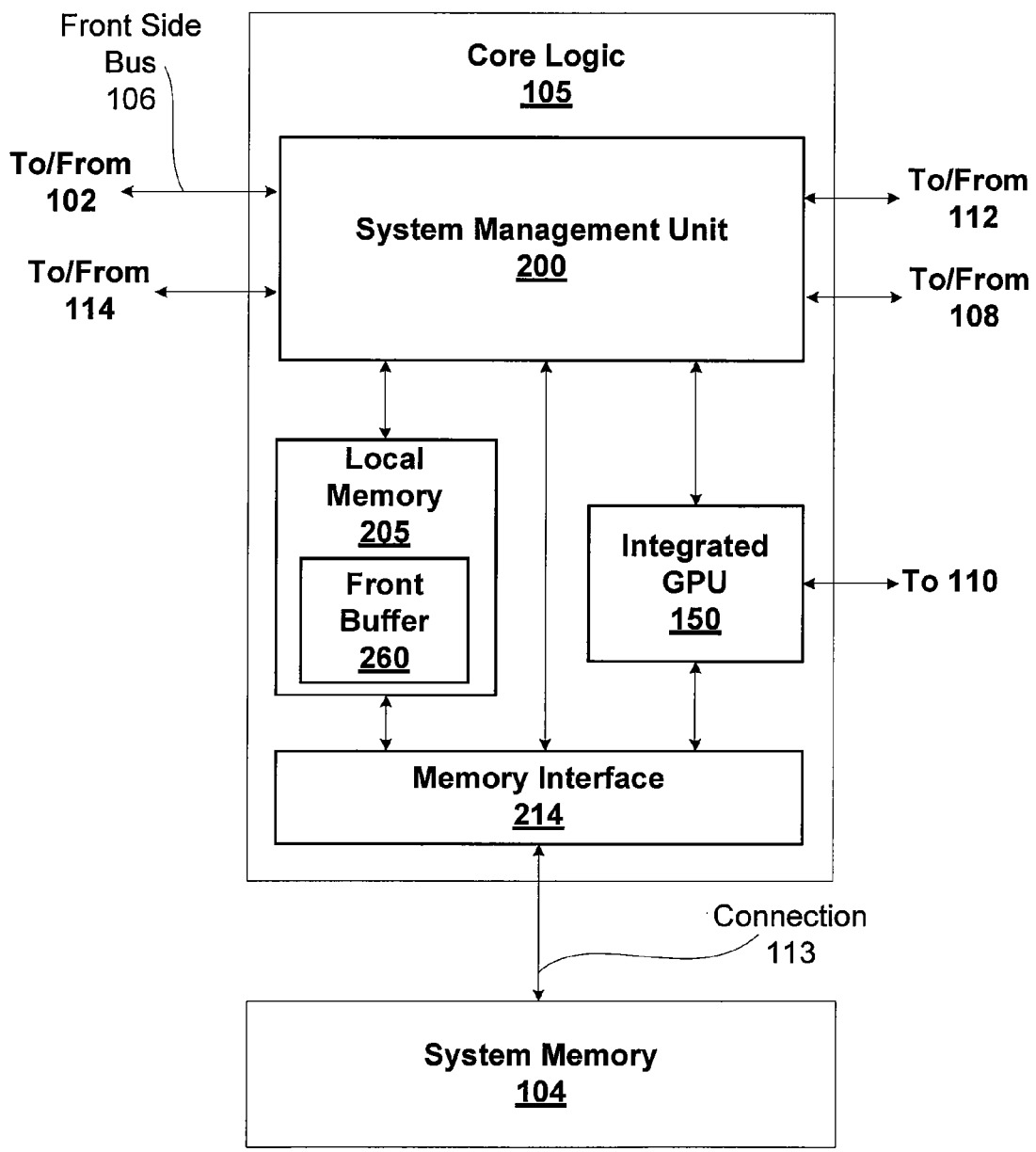
FIGS. 2A and 2B are block diagrams of core logic for the computer system of FIGS. 1A and 1B, respectively, in accordance with one or more aspects of the present invention.
Figure 2B:
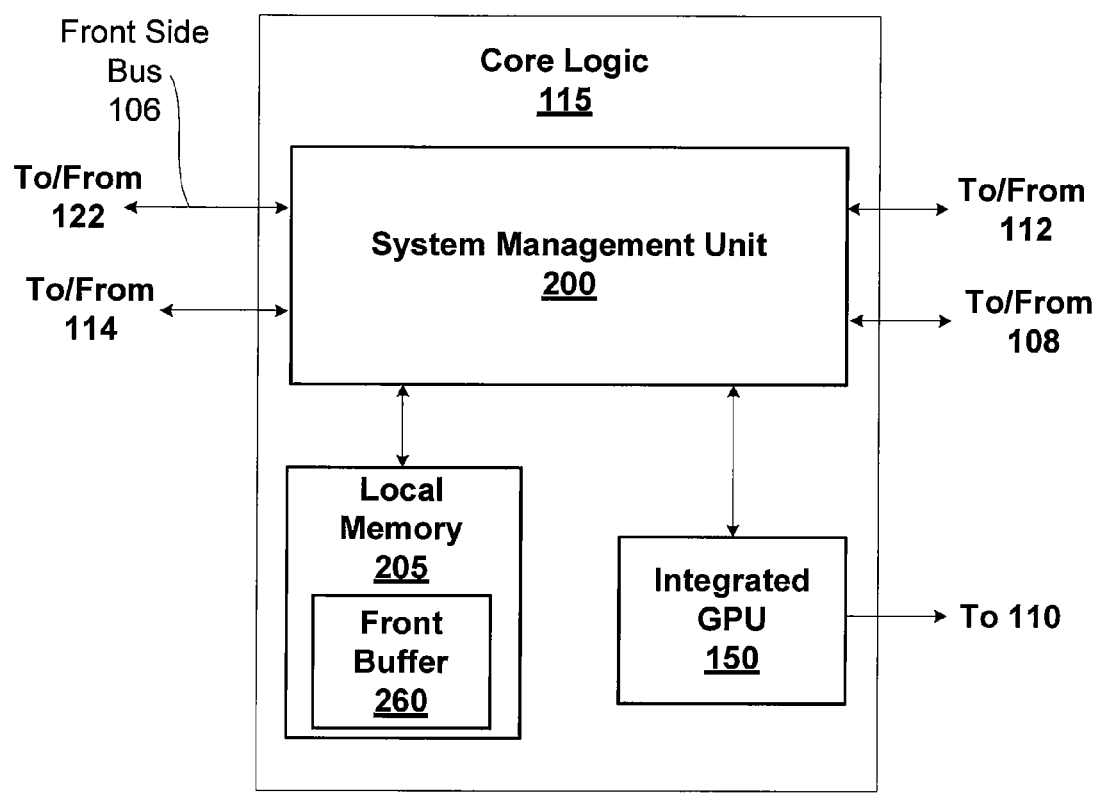

FIG. 2A is a block diagram of core logic 105 for the computer system 100 of FIG. 1A, in accordance with one or more aspects of the present invention. FIG. 2B is a block diagram of core logic 115 for the computer system 100 of FIG. 1B, in accordance with one or more aspects of the present invention. Core logic 105 and core logic 115 each include a system management unit 200 that may be an embedded low power processor such as an ARM (advanced reduced instruction set machine), PowerPC, or the like. System management unit 200 consumes less power than CPU 102 or CPU 122 and may be configured to perform at least a portion of the processing performed by CPU 102 or CPU 122, such as processing needed to service system interrupts.

Core logic 105 and core logic 115 each also include a local memory 205 that may configured to store a front buffer 260 that includes RGB image data for output to display device 110. Local memory 205 may also be configured to store a back buffer that is swapped with front buffer 260 in order to perform double-buffering of images for output to display device 110. The back buffer is written by integrated GPU 150 or discrete GPU 112 while front buffer 260 is displayed. After the display of front buffer 260 is complete, front buffer 260 is swapped with the back buffer and the image stored in the back buffer is displayed. Front buffer 260 and the back buffer may be stored in system memory 104 instead of local memory 205.

When the topology shown in FIG. 1B is used, data is transferred to and from system memory 104 through CPU 122 and connection 103. On-chip SRAM, on-chip embedded DRAM, off-chip DRAM, or the like, can be used to construct local memory 205. Local memory 205 and system memory 104 can be the same physical entity when system memory 104 is connected to core logic 105 directly, as shown in FIG. 1A.

System management unit 200 may be configured to determine when computer system 100 should enter and exit the low power operating mode. System management unit 200 is configured to power CPU 102 or CPU 122 up or down by enabling and disabling voltage inputs to CPU 102 and CPU 122. Similarly, system management unit 200 is configured to power discrete GPU 112 up or down by enabling and disabling a voltage input to GPU 112. As previously described, system management unit 200 may also be configured to power down other components within computer system 100, such as system memory 104 and integrated GPU 150.

In some embodiments of the present invention, core logic 105 includes a memory interface 214 that is used to interface with system memory 104. System management unit 200 provides computer system 100 with a hybrid processing capability since both system management unit 200 and CPU 102 or CPU 122 may be enabled, and CPU 102 or CPU 122 may be disabled while system management unit 200 is enabled.

Picture Processing

Figure 3:
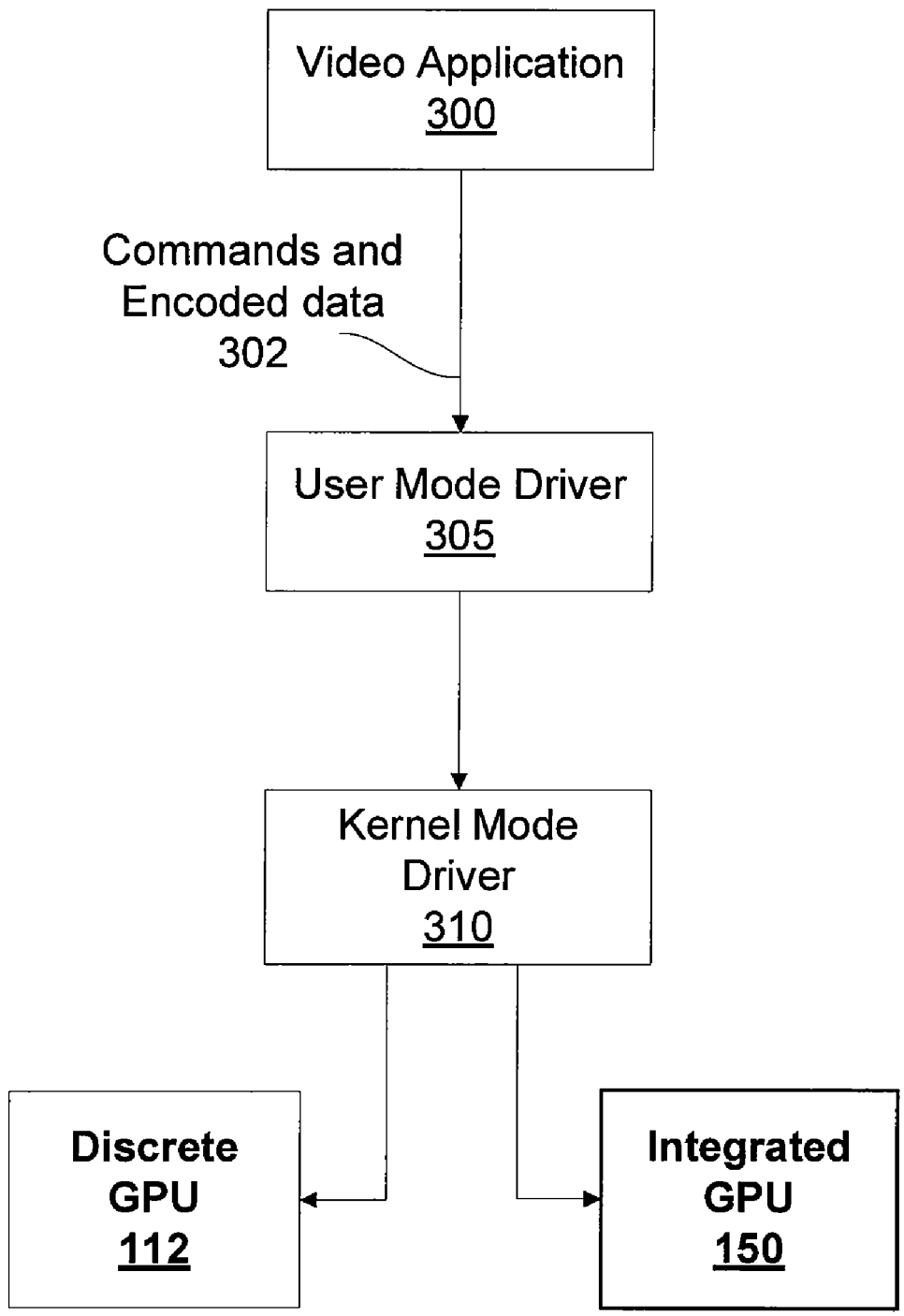
FIG. 3 is a conceptual diagram showing the distribution of processing between an integrated processor and a discrete processor in a hybrid system in accordance with one or more aspects of the present invention.

FIG. 3 is a conceptual diagram showing the distribution of processing between integrated GPU 150 and discrete GPU 112 of hybrid system 100, in accordance with one or more aspects of the present invention. A video application 300 executes on CPU 102 and commands and encoded data 302 are received by a user mode driver 305 that is stored in system memory 104. User mode driver 305 transfers commands and encoded data 302 to a kernel mode driver 310 for processing. Kernel mode driver 310 is aware of the hybrid configuration, in particular that integrated GPU 150 and discrete GPU 112 are both able to process commands and encoded data 302.

In a conventional hybrid system, kernel mode driver 310 splits the processing workload between integrated GPU 150 and discrete GPU 112 by having each GPU process a portion of the commands and encoded data 302. For example, integrated GPU 150 may process a first portion of commands and encoded data 302 to produce a top, bottom, right, or left portion of a surface for output to display device 110. Discrete GPU 112 may process a second portion of commands and encoded data 302 to produce the remaining portion of the surface for output to display device 110.

In a conventional system, hybrid or not, processing of final images for output to display 110 is performed in order to adjust the final RGB values to compensate for reduced backlighting, perform special effects on color channels, or to improve LCD responsiveness by over driving the color channels. The processing of the final RGB values are performed by discrete GPU 112 and is performed on data represented in the RGB color space for the best results. Therefore, video data represented in the YUV space is not typically processed in this manner or is processed in YUV space, resulting in a lower image quality. In conventional systems, the ability to perform this processing of the final images is limited to video playback data (excluding 3D graphics data) and reduces the performance on discrete GPU 112 since additional processing cycles are consumed to adjust the final RGB values.

In the preferred embodiment of the present invention, kernel mode driver 310 is configured to output commands and encoded data 302 to discrete GPU 112 for processing. Kernel mode driver 310 configures integrated GPU 150 to perform the processing of the final RGB values, as described in conjunction with FIG. 5. The processing of final images for output to display 110 may be performed by integrated GPU 150 on video, 2D, and 3D data processed by discrete GPU 112 in order to adjust the final RGB values to compensate for reduced backlighting, perform special effects on color channels, or to improve LCD responsiveness by over driving the color channels. Additionally, the performance of discrete GPU 112 is not reduced since the processing of the final RGB values is offloaded from discrete GPU 112 to integrated GPU 150. Furthermore, discrete GPU 112 produces the nth picture in a sequence while integrated GPU 150 processes the final RGB values of the (n−1)th picture in the sequence.

Figure 4:
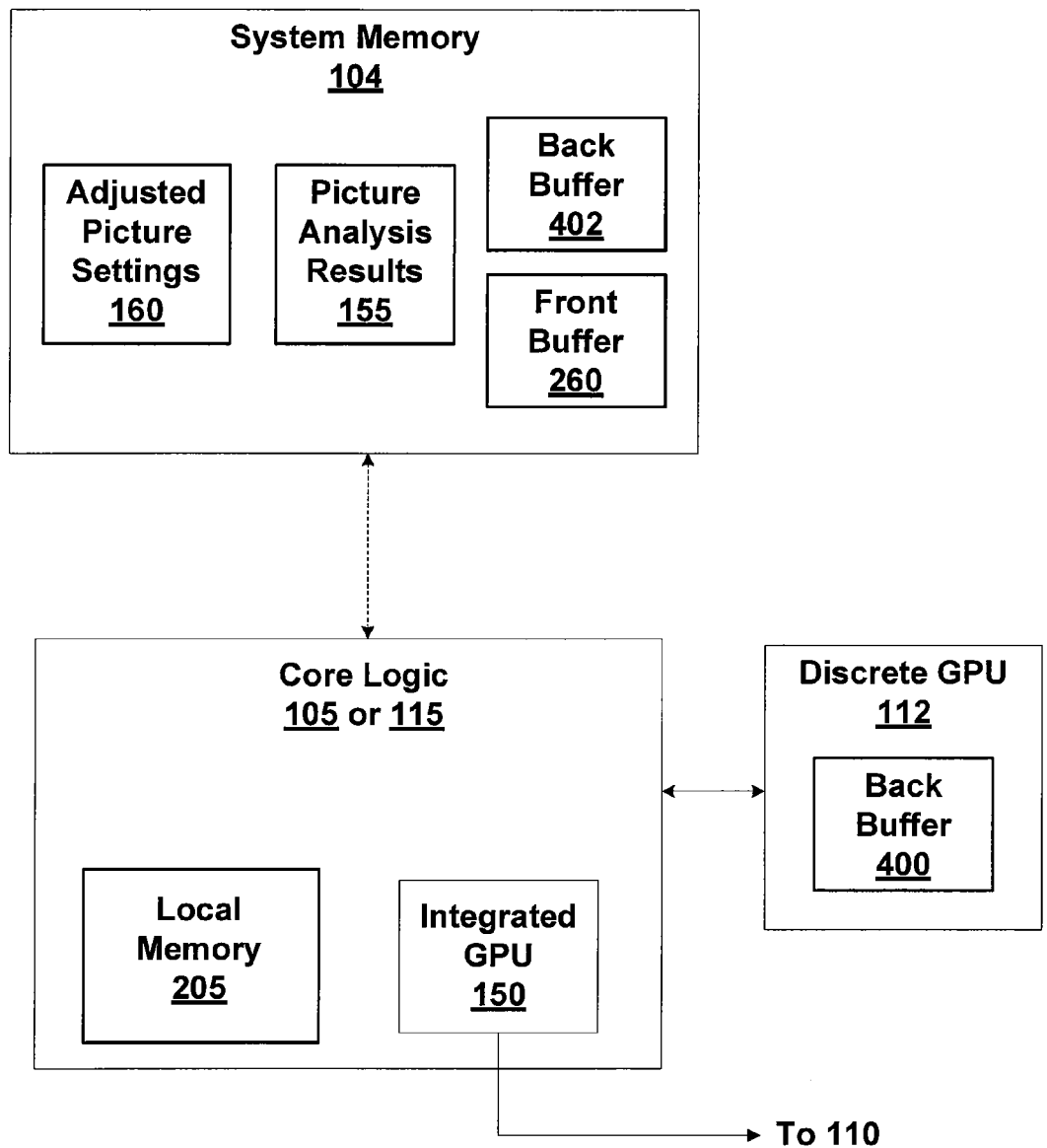
FIG. 4 is a diagram of a portion of the hybrid system illustrating the locations of buffers, picture analysis results, and adjusted picture settings in accordance with one or more aspects of the present invention.

FIG. 4 is a diagram of a portion of the hybrid system illustrating the locations of buffers, picture analysis results, and adjusted picture settings in accordance with one or more aspects of the present invention. One or more of front buffer 260, back buffer 402, picture analysis results 155, and adjusted picture settings 160 may be stored in local memory 205. A video engine in discrete GPU 112 decodes commands and encoded data 302 provided by kernel mode driver 310 and produces decoded data in YUV format. Discrete GPU 112 performs additional processing of the decoded YUV data using a 2D graphics, 3D graphics, and/or video engine within discrete GPU 112 to produce picture data in RGB format. Discrete GPU 112 stores the picture data in a back buffer 400. Back buffer 400 is transferred to the host system and stored in system memory 104 as back buffer 402. Once back buffer 400 is transferred, discrete GPU 112 may begin storing picture data for a different picture in back buffer 400.

Discrete GPU 112, CPU 102, or integrated GPU 150 analyzes the first picture to produce picture analysis results 155 that is stored in system memory 104. Picture analysis results 155 may represent a histogram of back buffer 402 sorted by varying contrast levels or sorted by varying channel color values for one or more channels (red, green, and blue). In order to perform the analysis, integrated GPU 150 may first convert the RGB data stored in back buffer 402 into Y (luma) data. Integrated GPU 150 may also be configured by kernel mode driver 310 to downscale back buffer 402 to 1024×768 pixels for improved performance (increased frame rate) when back buffer 400 is larger. Alternatively, integrated GPU 150 may be configured by kernel mode driver 310 to upscale back buffer 402 when the number of pixels produced by discrete GPU 112 is limited in order to sustain an interactive frame rate specified by device driver user mode driver 305. The upscaling or downscaling of the RGB picture data may be performed as the picture data is transferred from back buffer 400 to back buffer 402.

Picture analysis results 155 are then used to determine adjusted picture settings 160. For example, the contrast of the picture represented by back buffer 402 may be increased when a flat panel display backlight is reduced in order to reduce power consumption, i.e., when a SmartDimmer feature is used. Increasing the contrast improves the perceived visual quality (primarily brightness) of the displayed picture compared with displaying the picture using the reduced backlight and not increasing the contrast. Picture analysis results 155 may also represent a histogram of color channel values that are used to perform special effects on the color channels, such as Ambi-light. Adjusted picture settings 160 may specify modifications to one or more of the color channels based on picture analysis results 155. Finally, an LCD overdrive feature may be specified by adjusted picture settings 160 in order to reduce ghosting artifacts by temporarily overdriving the RGB color values to improve LCD responsiveness of display device 110.

Figure 5:
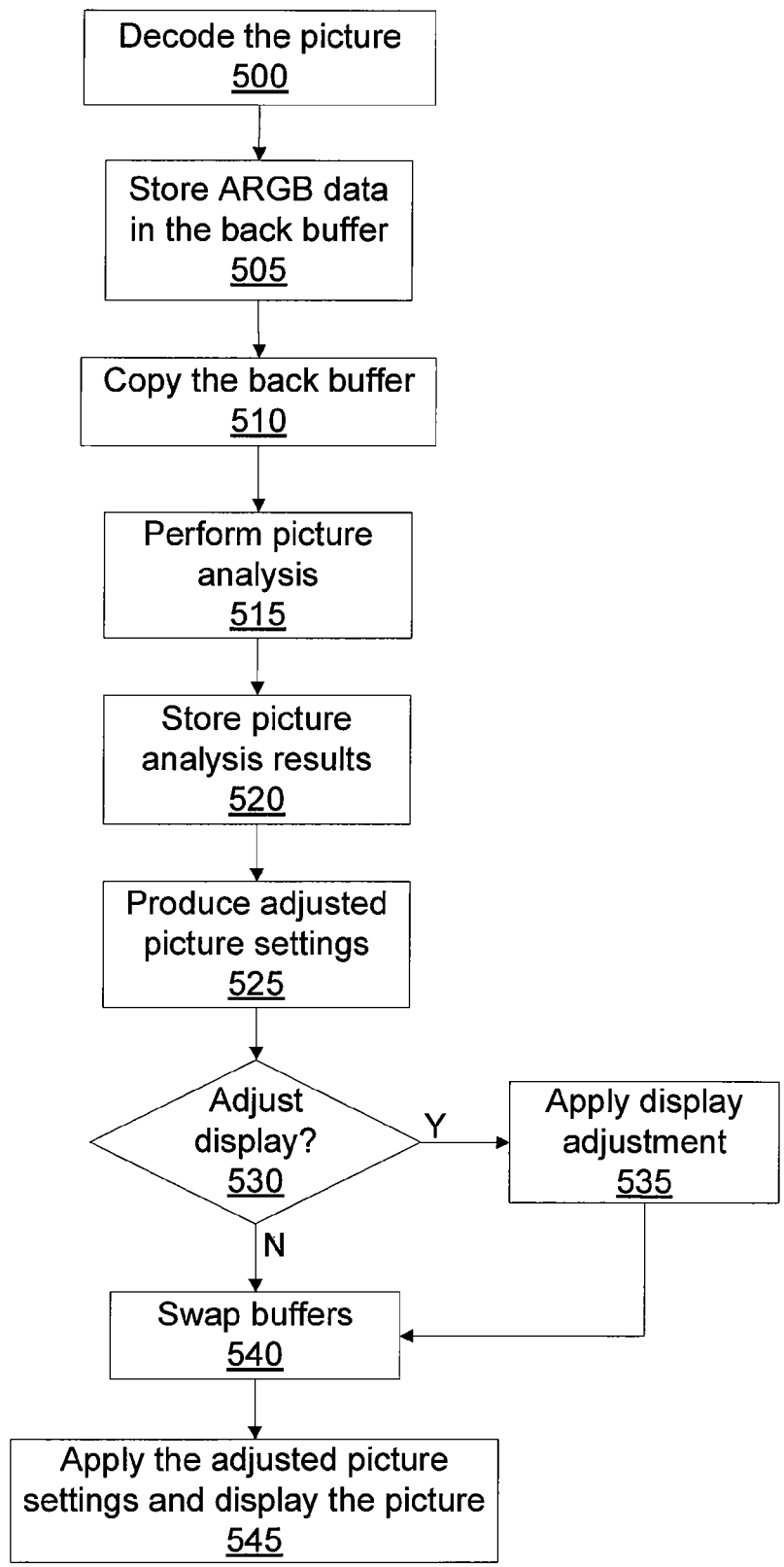
FIG. 5 is a flow diagram of method steps for processing pictures using the hybrid system in accordance with one or more aspects of the present invention.

FIG. 5 is a flow diagram of method steps for processing pictures using hybrid system 100, in accordance with one or more aspects of the present invention. In step 500 discrete GPU 112 decodes the picture to produce picture data that is stored in back buffer 400 as ARGB format data in step 505. The picture may be decoded using commands and encoded data 302 from video application 300 or 2D or 3D graphics data provided by a graphics application that is rendered by discrete GPU 112 to produce the picture data. In step 510 back buffer 400 is copied to back buffer 402. As previously explained, integrated GPU 150 may be configured to upscale or downscale the picture data as it is copied from back buffer 400 to back buffer 402. Integrated GPU 150 may also be configured to convert picture data into RGB format data as the data is copied from back buffer 400 to back buffer 402.

In step 515 integrated GPU 150 is configured to analyze back buffer 402 to produce picture analysis results 155. In some embodiments of the present invention CPU 102 may be configured to produce picture analysis results 155. In step 520 picture analysis results 155 are stored in system memory 104 or local memory 205. In step 525 picture analysis results 155 are analyzed to produce adjusted picture settings 160 that represents adjusted settings to be applied to the picture data stored in back buffer 402 as the picture data is output to display device 110. Adjusted picture settings 160 accounts for changes in backlighting, color channel effects, and other power reduction or display options. CPU 102 or integrated GPU 150 may be configured to produce adjusted picture settings 160.

In step 530 core logic 105 or 115 determines if any display adjustments will be made to control display device 110, e.g., changes in backlight levels, or the like. If, display adjustments are made, in step 535 the display adjustments are applied to display device 110. In step 540 front buffer 260 is swapped with back buffer 402, so that back buffer 402 is output to display device 110. In step 545 integrated GPU 150 is configured to read the picture data from back buffer 402 and apply adjusted picture settings 160 before outputting the adjusted picture data to display device 110.

The processing of final images for output to display device 110 is offloaded from discrete GPU 112 to integrated GPU 150, improving the processing performance of video and graphics data by discrete GPU 112. Integrated GPU 150 is able to adjust the final RGB values of the picture data resulting from video and 2D and/or 3D graphics processing to compensate for reduced backlighting, perform special effects on color channels, or to improve LCD responsiveness by over driving the color channels.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A system configured for reduced power consumption when performing processing tasks, the system comprising:
   a first processing entity capable of performing a set of operations; and
   a second processing entity configured to consume less power than the first processing entity and capable of performing a subset of operations that is part of the set of operations,
   wherein the second processing entity is configured to perform the subset of operations instead of the first processing entity during system operation.

2. The system of claim 1, wherein the first processing entity comprises a central processing unit.

3. The system of claim 2, wherein the second processing entity includes a system management unit that is configured to perform the subset of operations.

4. The system of claim 3, wherein system management unit comprises an advanced reduced instruction set machine.

5. The system of claim 1, wherein the first processing entity is configured to be powered-down during system operation when the system enters a low-power mode.

6. The system of claim 5, wherein the second processing entity is configured to perform the subset of operations during system operation when the system is in the low-power mode and the first processing entity is powered down.

7. The system of claim 6, wherein the first processing entity comprises a central processing unit.

8. The system of claim 6, wherein the first processing unit comprises a discreet graphics processing unit.

9. The system of claim 5, wherein the second processing entity includes a system management unit that is configured to power down the first processing unit during system operation when the system enters the low-power mode.

10. The system of claim 9, wherein the system management unit is configured to power down the first processing entity during system operation by disabling a voltage input to the first processing entity.

11. The system of claim 1, wherein the first processing unit comprises a discreet graphics processing unit.

12. The system of claim 9, wherein the second processing entity includes an integrated graphics processing unit configured to perform the subset of operations.

13. The system of claim 1, further comprising a third processing entity that is capable of performing a second set of operations, wherein the second processing entity is configured to consume less power than the third processing entity and is capable of performing a second subset of operations that is part of the second set of operations, and wherein the system is configured to operate in a low-power mode in which the first processing unit and the third processing unit are powered down, and the second processing entity is configured to perform the subset of operations instead of the first processing entity and to perform the second subset of operations instead of the third processing entity.

14. The system of claim 13, wherein the first processing entity comprises a central processing unit, and the third processing unit comprises a discreet graphics processing unit.

15. The system of claim 14, wherein the second processing unit includes a system management unit configured to perform the subset of operations and an integrated graphics processing unit configured to perform the second subset of operations.

16. The system of claim 15, wherein the system management unit comprises an advanced reduced instruction set machine.

17. A computing device, comprising:
   a memory;
   a first processing entity capable of performing a set of operations; and
   a second processing entity configured to consume less power than the first processing entity and capable of performing a subset of operations that is part of the set of operations,
   wherein the second processing entity is configured to perform the subset of operations instead of the first processing entity during operation.

18. The computing device of claim 17, wherein the first processing entity is configured to be powered-down during system operation when the system enters a low-power mode.

19. The computing device of claim 18, wherein the second processing entity is configured to perform the subset of operations during system operation when the system is in the low-power mode and the first processing entity is powered down.

20. The computing device of claim 19, wherein the first processing entity comprises a central processing unit or a discreet graphics processing unit.

* * * * *